No. 864,626. PATENTED AUG. 27, 1907.
W. H. DOUGLAS.
CONTROLLER FOR DRIVING GEARS.
APPLICATION FILED SEPT. 26, 1906.
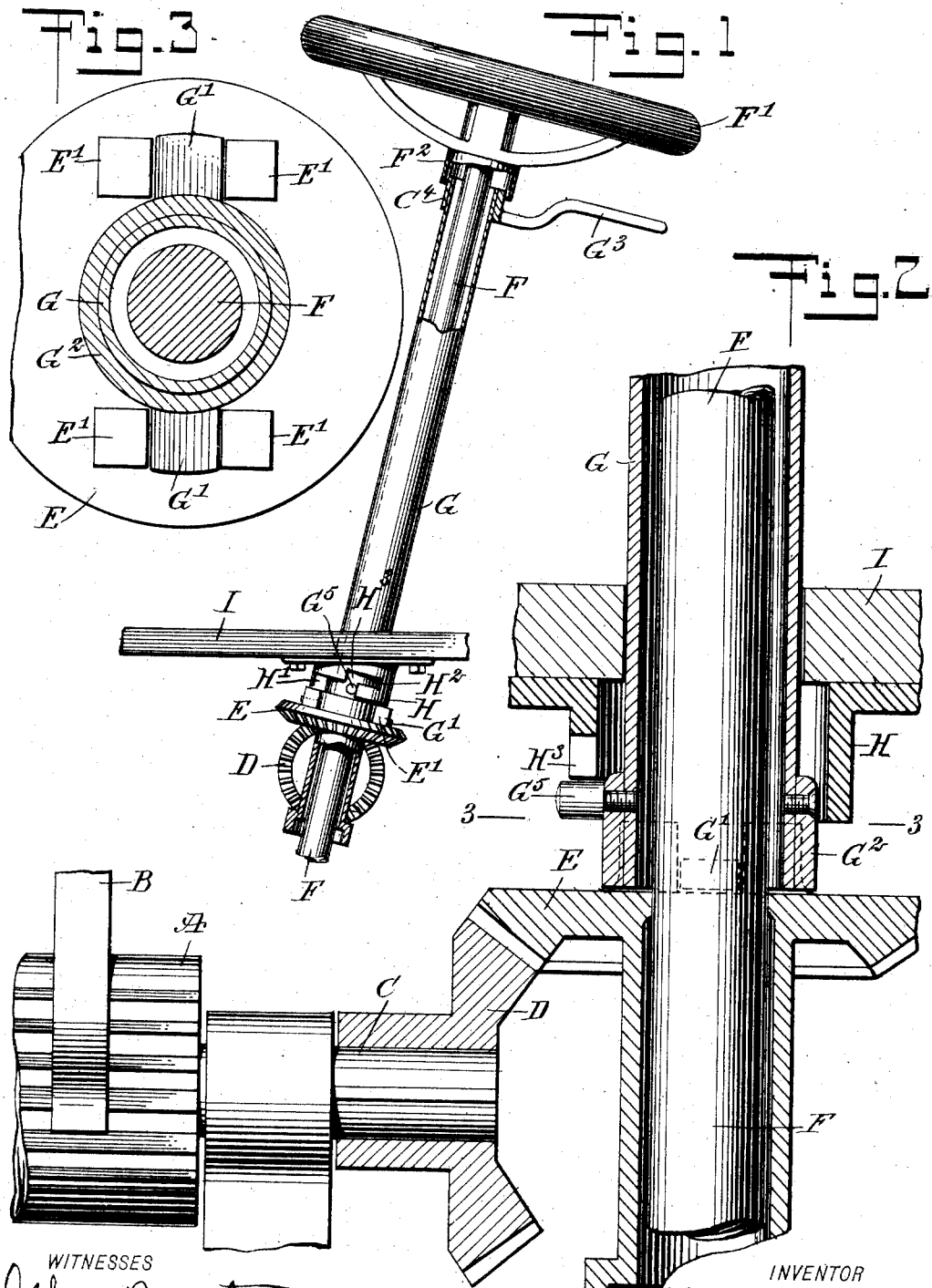
WITNESSES
INVENTOR
William Henry Douglas
BY
ATTORNEYS

UNITED STATES PATENT OFFICE.

WILLIAM HENRY DOUGLAS, OF BELLEVILLE, NEW JERSEY, ASSIGNOR TO HEALEY & CO., OF NEW YORK, N. Y., A CORPORATION.

CONTROLLER FOR DRIVING-GEARS.

No. 864,626.      Specification of Letters Patent.      Patented Aug. 27, 1907.

Application filed September 26, 1906. Serial No. 336,257.

*To all whom it may concern:*

Be it known that I, WILLIAM HENRY DOUGLAS, a citizen of the United States, and a resident of Belleville, in the county of Essex and State of New Jersey, have invented a new and Improved Controller for Driving-Gears, of which the following is a full, clear, and exact description.

The invention relates to automobiles and other motor vehicles, and its object is to provide a new and improved controlling device for the driving gear of motor vehicles, arranged to enable the operator to change speed gradually when running forward or backward, and to compel the operator to reduce the speed to zero before being able to reverse the driving gear.

The invention consists of novel features and parts and combination of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to the driving gear on a motor vehicle, parts being in section; Fig. 2 is an enlarged transverse section of the same, and Fig. 3 is a sectional plan view of the same on the line 3—3 of Fig. 2.

The speed changing device of the electrically driven motor vehicle is of the usual construction, and is provided with an electric controlling drum A and contacting fingers B connected with the motor for driving the vehicle with increased or decreased speed, and for reversing the motor according to the direction in which the electric controlling drum is turned.

On the electric controlling drum shaft C is secured a bevel gear wheel D in mesh with a bevel gear wheel E mounted to turn loosely on the steering post F of the usual construction, which post is connected with the steering device of the vehicle, the said post being turned by the operator manipulating a steering wheel F′ secured on the upper end of the steering post F, as shown in Fig. 1. On the top of the gear wheel and on diametrically opposite points are arranged sets of lugs E′ engaged by pins G′ held on the lower end $G^2$ of a tubular stem G, through which extends loosely the steering post F, the said stem being provided at its upper end with a handle $G^3$ under the control of the operator, to enable the latter to turn the stem G and to slide the same in the direction of its length, as hereinafter more fully described. The hub $G^4$ of the handle $G^3$ extends into the hub $F^2$ of the steering wheel F′, so as to prevent dust, clay and the like from passing into the tubular stem G. On the lower end $G^2$ of the tubular stem G is secured a pin $G^5$ adapted to travel in slots H′, $H^2$, $H^3$ formed in a tubular member H surrounding the tubular stem G and fixed to the underside of the platform I of the motor vehicle. The guiding slots H′, $H^2$ are arranged in different planes and extend in opposite directions from the slot $H^3$ connecting the slots H′, $H^2$ with each other, as plainly shown in Fig. 1.

Now when the several parts are in the position as illustrated in the drawings and the pin $G^5$ is in the connecting slot $H^3$ at the starting end of the slot H′ then the electric controlling drum A is in a zero position, and when the operator now turns the handle $G^3$ from the right to the left then the pin $G^5$ travels in the slot H′, and the pins G′ in engagement with the lugs E′ turn the gear wheel E which turns the gear wheel D, the shaft C and the electric controlling drum A, to cause the motor to drive the vehicle forward the desired speed. Now when it is desired to reverse the motor and cause the vehicle to travel backward then the operator turns the handle $G^3$ from the left to the right until the pin $G^5$ strikes the end wall of the guiding slot H′, so that the electric controlling drum A is turned to zero position, and then the operator lifts the handle $G^3$ to cause the pin $G^5$ to travel up in the connecting slot $H^3$, after which the operator turns the handle $G^3$ further in the direction from the left to the right, so that the pin $G^5$ now travels in the guiding slot $H^2$. The forward sliding motion given to the tubular stem G does not disconnect the pins G′ from the lugs E′, as the latter are sufficiently long to allow a sliding movement of the pins G′ between the lugs E′ without disengagement, so that the gear wheel E is turned in the reverse direction, and consequently the electric controlling drum A in the same reverse direction, to reverse the motor and drive the same in a reverse direction with the desired speed. When it is desired to stop the reverse movement of the motor and the backward movement of the vehicle, the operator swings the handle $G^3$ from the right to the left until the pin $G^5$ abuts against the starting end of the slot $H^2$, thus bringing the electric controlling drum A into zero position, and then the operator drops the handle $G^3$, to allow the pin $G^5$ to pass back into its lowermost position at the beginning end of the slot H′.

Now from the foregoing it will be seen that by the arrangement described the operator is compelled to reduce the speed of the motor to zero before being able to reverse the driving gear, so that the change from forward to backward driving of the vehicle is accomplished without shock and jar and without danger of injury to the driving parts.

It is understood that the guiding slots H′, $H^2$ form paths for the pin $G^5$, and the said paths are located in different planes and the ends thereof form positive stops for the pin $G^5$, so that the operator knows instantly when the electric controlling drum has been turned into zero position.

The device is very simple and durable in construction and can be readily applied to motor vehicles as now constructed, it being however understood that the device is equally applicable to the speed changing device of motor vehicles driven by electricity, gasolene or other motive power, and hence I do not limit myself to the particular construction and application of the device as shown in the drawings and herein described.

Having thus described my invention, I claim as new and desire to secure by Letters Patent:

1. The combination with the steering post and the controller for the driving gear, of a sleeve provided with a handle and slidable on the post, a gear journaled on the lower end of the post for actuating the controller, said gear being provided with spaced lugs on the upper face thereof, said sleeve having pins for engaging between the lugs, a fixed collar encircling the sleeve, said collar being provided with parallel slots extending in opposite directions, a pin on the sleeve for engaging the slots, said slots being arranged in different planes and being connected at their adjacent ends by a transverse slot, said transverse slot corresponding to the position of the pin when the controller is at zero position, whereby to provide a positive stop for the controller at said zero position.

2. The combination with the steering post and the controller for the driving gear, of a sleeve provided with a handle and slidable on the post, a gear journaled on the lower end of the post for actuating the controller, said gear having a sliding connection with the sleeve, a fixed collar encircling the sleeve, and provided with parallel slots extending in opposite directions, a pin on the sleeve for engaging the slots, said slots being arranged in different planes and being connected at their adjacent ends by a transverse slot, said transverse slot corresponding to the position of the pin when the controller is at zero position, whereby to provide a positive stop for the controller at said zero position.

3. The combination with the steering post and the controller for the driving gear, of a sleeve provided with a handle and slidable on the post, a gear journaled on the lower end of the post for actuating the controller, a slidable connection between the gear and the sleeve, a fixed number provided with guides arranged in different planes and extending in opposite directions, and a transverse guide connecting the adjacent ends of said guides, a pin on the sleeve for engaging the guides, said transverse guide corresponding to the position of the pin when the controller is at zero position, whereby to provide a positive stop for the controller at said zero position.

4. The combination with the steering post and the controller for the driving gear, of a sleeve provided with a handle and slidable on the post, a connection between the sleeve and the controller for actuating the same, a fixed member provided with guides arranged in different planes and extending in opposite directions, and a transverse guide connecting the adjacent ends of said guides, a pin on the sleeve for engaging the guides, said transverse guide corresponding to the position of the pin when the controller is at zero position, whereby to provide a positive stop for the controller at said zero position.

In testimony whereof I have signed my name to this specification in the presence of two subscribing witnesses.

WILLIAM HENRY DOUGLAS.

Witnesses:
 THEO. G. HOSTER,
 EVERARD B. MARSHALL.